J. C. COVERT.

Snap Hook.

No. 9,527. Reissued Jan. 4, 1881.

Witnesses.
Franck L. Durand
J. J. McCarthy

Inventor:
J. C. Covert.
By Alexander Hudson
atty

N. PETERS, PHOTO-LITHOGRAPHER, WASHINGTON, D. C.

UNITED STATES PATENT OFFICE.

JAMES C. COVERT, OF WEST TROY, NEW YORK.

SNAP-HOOK.

SPECIFICATION forming part of Reissued Letters Patent No. 9,527, dated January 4, 1881.

Original No. 74,897, dated February 25, 1868. Application for reissue filed November 4, 1880.

*To all whom it may concern:*

Be it known that I, JAMES C. COVERT, of West Troy, in the county of Albany and State of New York, have invented certain new and useful Improvements in Snap-Hooks; and I do hereby declare that the following is a full, clear, and exact description thereof, reference being had to the accompanying drawings, and to the letters of reference marked thereon, which form a part of this specification, in which—

Figure 1:
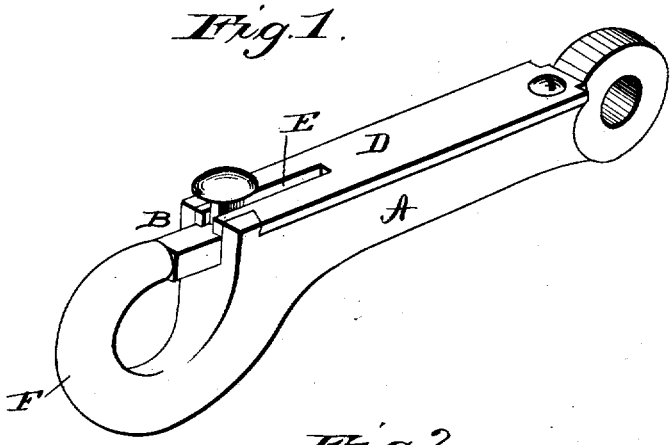
Figure 2:
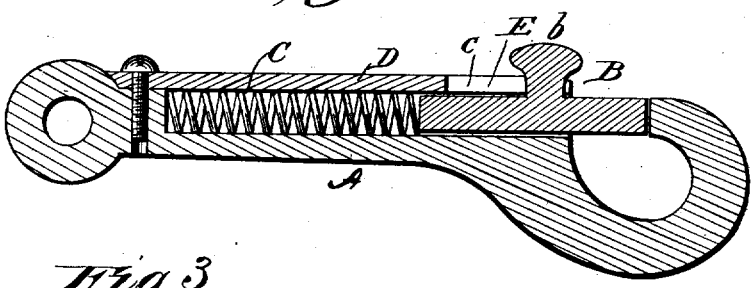
Figure 3:
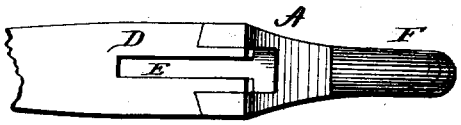
Figure 4:
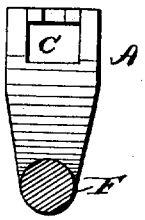

Figure 1 represents a perspective view of my improved snap-hook complete; Fig. 2, a longitudinal sectional view of the same; Fig. 3, a partial top view of the snap-hook, and Fig. 4 a transverse vertical section through the hook proper.

This invention relates to certain improvements in that class of snap-hooks which are constructed with a sliding bolt adapted to abut and lock against the hook. In this class of snap-hooks, as heretofore constructed, the bolt has been journaled in bearings formed on the body of the hook and the bolt pressed forward by means of a spiral spring surrounding it, the bolt being confined in place by a pin, against which one end of the spring bears, the pin projecting through a slot and carrying a thumb-button, by which the bolt may be retracted. As thus formed, the snap-hook proves objectionable, for the reason that the spring is exposed and liable to rust and rapidly wear out, and as it surrounds the bolt it makes the article bulky and clumsy. The principal objection, however, lies in the fact that the labor attendant upon the finishing and fitting of the parts together greatly enhances the cost of the article.

The object of my invention is to obviate these objections, and this object I attain by constructing the body of the snap-hook and the bolt of cast metal, the body having a longitudinal groove or recess open at its forward end and cast in it for the reception of the bolt and spring, and the bolt being formed complete with the thumb-button in one piece, in such manner that the spring and bolt may be inserted in the groove or recess and adapted to work properly therein without any finishing whatever.

In the annexed drawings, the letter A indicates the body or shank of the snap-hook, and B the bolt thereof, both of which are constructed of cast metal. The body or shank has cast in it a longitudinal groove or recess, C, which is open at the forward or hook end of the said body or shank. The bolt B is formed with its thumb-button *b* complete in one piece, and the portion *c* is of such shape and size as to fit neatly in the groove or recess and slide freely therein.

In order to protect the spring and confine the same and the bolt in place, a plate, D, is secured to the body or shank of the snap-hook above the groove or recess, the said plate being provided with an open-ended slot, E, into which the shank of the thumb-button may be passed and adapted to slide.

The letter F indicates the hook against the end of which the bolt abuts when in a normal position.

It is evident that the body as constructed with the longitudinal groove or recess may be employed in connection with a bolt having its thumb-button constructed separately and attached, and therefore I do not wish to limit myself to such body when employed with a solid bolt alone.

The body or shank and the bolt being constructed as above described, it is evident that they may be fitted together by simply inserting the bolt in the groove or recess forward of the spring, after which the plate E is secured in place. The said plate will form an inclosed recess with the rear portion of the longitudinal groove or recess holding and protecting the spring, while it will also hold the bolt in place, the shank of the button of which will play in the open-ended slot in said plate.

Having thus fully described my invention, what I claim, and desire to secure by Letters Patent, is—

1. A snap-hook having its body or shank constructed with a longitudinal inclosed groove or recess for the reception of the bolt, and provided with an open-ended slot at its forward or hook end, in which the shank of the thumb-button is adapted to be passed and to play, substantially as specified.

2. A snap-hook having the body and bolt constructed of cast metal, the body being formed with a longitudinal inclosed groove or recess for the reception of the bolt, and the bolt formed complete in one piece, whereby it can be fitted and adapted to work in the groove or recess, substantially as specified.

3. The combination, in a snap-hook, of the body constructed with a longitudinal inclosed recess or groove, the spring located in the recess or groove behind the bolt, and the bolt adapted to fit and work in said groove, substantially as specified.

4. A snap-hook consisting of a body or shank having a longitudinal inclosed groove or recess open at its forward end and provided with a slot at said end, a bolt provided with a thumb-button and adapted to slide in said groove or recess, a spring located at the rear of the bolt in an inclosed recess, and a hook at the forward end, against which the bolt abuts normally, substantially as specified.

In testimony that I claim the foregoing I have hereunto set my hand this 28th day of October, 1880.

JAMES C. COVERT.

Witnesses:
J. J. McCarthy,
C. M. Alexander.